(12) United States Patent
Ikonomov

(10) Patent No.: US 9,276,930 B2
(45) Date of Patent: Mar. 1, 2016

(54) DEVICE FOR CONTROLLING NETWORK USER DATA

(76) Inventor: Artashes Valeryevich Ikonomov, Moscow (RU)

( * ) Notice: Subject to any disclaimer, the term of this patent is extended or adjusted under 35 U.S.C. 154(b) by 50 days.

(21) Appl. No.: 14/346,269

(22) PCT Filed: Jul. 23, 2012

(86) PCT No.: PCT/RU2012/000600
§ 371 (c)(1),
(2), (4) Date: Mar. 20, 2014

(87) PCT Pub. No.: WO2013/058678
PCT Pub. Date: Apr. 25, 2013

(65) Prior Publication Data
US 2014/0237579 A1 Aug. 21, 2014

(30) Foreign Application Priority Data
Oct. 19, 2011 (RU) ................. 2011142228

(51) Int. Cl.
*H04L 9/32* (2006.01)
*H04L 29/06* (2006.01)
*G06Q 10/10* (2012.01)
*G06Q 50/00* (2012.01)

(52) U.S. Cl.
CPC .............. *H04L 63/083* (2013.01); *G06Q 10/10* (2013.01); *G06Q 50/01* (2013.01); *H04L 9/3226* (2013.01)

(58) Field of Classification Search
CPC ............................ H04L 63/083; H04L 9/3226
USPC ............................................... 726/2, 5, 8, 17
See application file for complete search history.

(56) References Cited

U.S. PATENT DOCUMENTS

| 6,476,830 B1 | 11/2002 | Farmer et al. |
| 7,208,669 B2 | 4/2007 | Wells et al. |
| 7,275,095 B1 | 9/2007 | Lebouill |
| 7,359,941 B2 | 4/2008 | Doan et al. |

(Continued)

FOREIGN PATENT DOCUMENTS

| EP | 1343130 A2 | 9/2003 |
| EP | 1522920 B1 | 6/2005 |

(Continued)

OTHER PUBLICATIONS

"Biometrics of Next Generation: An Overview"—Jain et al, MSU, Apr. 2010 http://www2.cse.msu.edu/~rossarun/BiometricsText-Book/Papers/Introduction/JainKumarNextGenBiometrics_BookChap10.pdf.*

(Continued)

*Primary Examiner* — Randy Scott
(74) *Attorney, Agent, or Firm* — Westerman, Hattori, Daniels & Adrian, LLP

(57) ABSTRACT

A device for controlling input, storage and deletion network user data includes a system of aliases for presenting a user with a plurality of aliases (nicknames) with the aim of sorting the computer network resources according to composition and access. Resources can be divided between different aliases according to access to said resources.

A search option is ensured by the provision of an attribute search unit. A user enters a logic query for a search by means of an input unit, and then the attribute search unit produces a comparison of values for attributes set in the search query with values for the attributes of all of the aliases and from these selects those which correspond to the search criteria.

1 Claim, 1 Drawing Sheet

(56) References Cited

U.S. PATENT DOCUMENTS

| | | |
|---|---|---|
| D627,790 S | 11/2010 | Chaudhri |
| 2002/0078358 A1 | 6/2002 | Neff et al. |
| 2003/0117531 A1 | 6/2003 | Rovner et al. |
| 2003/0124499 A1 | 7/2003 | Kumar et al. |
| 2005/0218224 A1 | 10/2005 | Boldin |
| 2006/0187193 A1 | 8/2006 | Esquilin |
| 2007/0167204 A1 | 7/2007 | Lyle et al. |
| 2008/0077532 A1 | 3/2008 | Von Hessen et al. |
| 2008/0184122 A1 | 7/2008 | Grant et al. |
| 2009/0177744 A1 | 7/2009 | Marlow et al. |
| 2009/0216551 A1* | 8/2009 | Chen ............... G06F 17/30702 705/319 |
| 2009/0228322 A1 | 9/2009 | van Os et al. |
| 2009/0271270 A1 | 10/2009 | Regmi et al. |
| 2010/0064259 A1 | 3/2010 | Alexanderovitc et al. |
| 2010/0088753 A1* | 4/2010 | Ayres ................. G06F 21/41 726/9 |
| 2011/0141141 A1 | 6/2011 | Kankainen |
| 2011/0216935 A1 | 9/2011 | Mays et al. |
| 2012/0084669 A1 | 4/2012 | Flint et al. |
| 2013/0017878 A1 | 1/2013 | Kitreotis |

FOREIGN PATENT DOCUMENTS

| | | |
|---|---|---|
| RU | 2124753 C1 | 1/1999 |
| RU | 2178922 C1 | 1/2002 |
| RU | 2000112271 A | 4/2002 |
| RU | 2253895 C2 | 6/2005 |
| RU | 2279191 C1 | 6/2006 |
| RU | 2291483 C1 | 1/2007 |
| RU | 2305321 C1 | 8/2007 |
| RU | 70387 | 1/2008 |
| RU | 2006136310 A | 4/2008 |
| RU | 2331913 C2 | 8/2008 |
| RU | 2331918 C2 | 8/2008 |
| RU | 2363984 C2 | 8/2009 |
| RU | 2378987 C1 | 1/2010 |
| RU | 2391229 C1 | 6/2010 |
| RU | 2403944 C1 | 11/2010 |
| RU | 2009126832 A | 1/2011 |
| RU | 2415466 C1 | 3/2011 |
| RU | 2419831 C2 | 5/2011 |
| WO | 2004/079514 A2 | 9/2004 |
| WO | 2005/040965 A2 | 5/2005 |
| WO | 2007/100239 A1 | 9/2007 |
| WO | 2009/155142 A2 | 12/2009 |
| WO | 2010/068781 A1 | 6/2010 |
| WO | 2013077765 A1 | 3/2013 |
| WO | 2013172742 A1 | 11/2013 |
| WO | 2013180599 A2 | 12/2013 |
| WO | 2013180599 A3 | 12/2013 |
| WO | 2013191592 A1 | 12/2013 |
| WO | 2014007678 A1 | 1/2014 |
| WO | 2014011088 A2 | 1/2014 |
| WO | 2014011088 A3 | 1/2014 |

OTHER PUBLICATIONS

International Search Report for PCT/RU2012/000600, Mailing Date of Dec. 13, 2012.

* cited by examiner

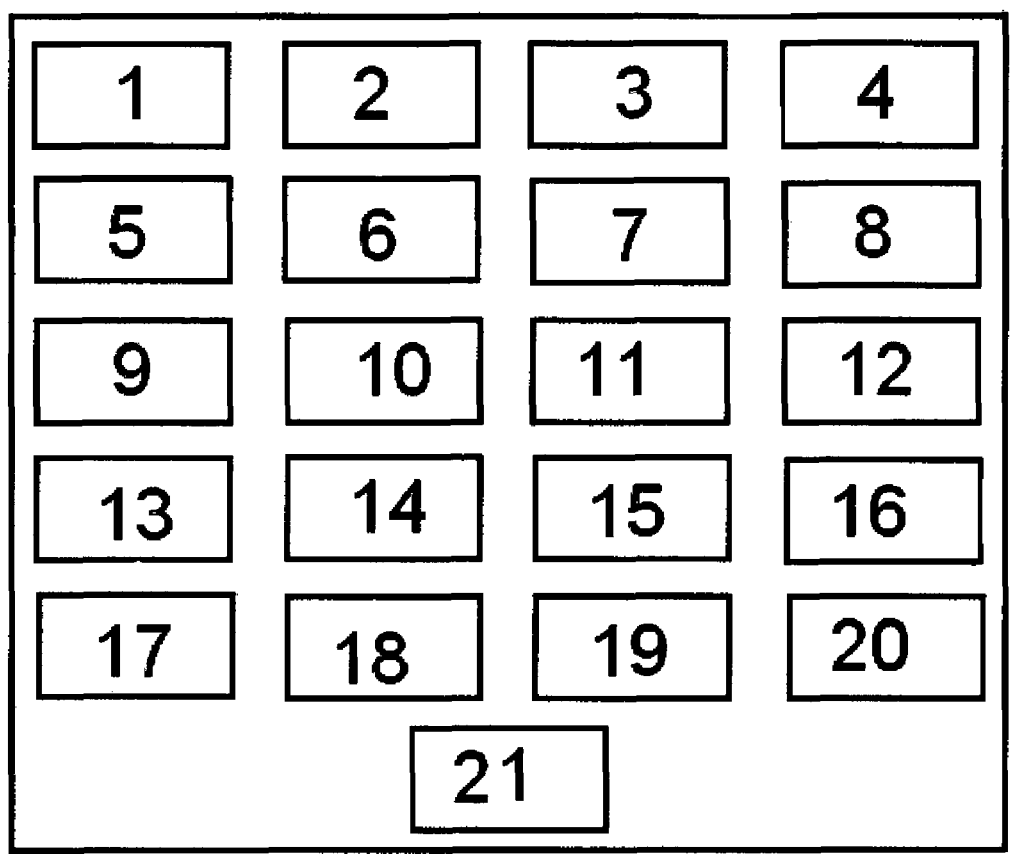

DEVICE FOR CONTROLLING NETWORK USER DATA

TECHNICAL FIELD OF INVENTION

This utility model relates to devices for controlling (input, storage and deletion) network user data.

DESCRIPTION OF PRIOR ART

It is known a Yandex mailbox registration device (http://passport.yandex.ru/passport?mode=register&msg=mail&retpath=http%3A%2F%2Fmail.yandex.ru). The Yandex mailbox registration device comprises a user identification data storage unit, a user geographical data storage unit, a unit for storage of login and password for user access, a login and password verification unit, an input unit, a unit for storage of a standard configuration of resources, a control unit and a visualization unit. Said units collectively enable user information input and storage, creation of a login and password for access to the system by comparing the login and password entered with the login and password stored in the unit for storage of login and password for user access and also adding the standard configuration of resources (a photo storage resource, a CV or website building unit) to the created mailbox.

The known technical solution has a drawback, namely, low functionality of the device, i.e. linking only one set of identification data to a user; no option for grouping the resources offered by the mailbox around a plurality of purposes of the same registered user; no isolation option for access of the same user to various resource groups.

The offered utility model is directed toward extending functional possibilities by virtue of organizing a system of pseudonyms (aliases), the possibility of grouping and assigning to aliases different groups of resources, including resources that enable communication with other clients in the network (e.g. a social network), presenting a real user with a plurality of aliases with the aim of sorting the resources of a network (e.g. a social network) by composition, which makes it possible for the user to set limits for access to different groups of resources with the aid of passwords. Resources of one type can be divided between different aliases according to access to said resources. For instance, different photo albums can be linked to different aliases; for this purpose, some albums will be accessible on the device if an alias without the password was used to access the system, while access to other albums can only be granted if the system was accessed using an alias with the password. Each of the aliases can be accompanied with a unique description of its characteristic attributes so that the user can be represented in the network as different identities.

DISCLOSURE OF THE INVENTION

The object in view is accomplished by the following solution: the device for controlling network user data comprises a user identification data storage unit, a user geographical data storage unit, a unit for storage of login and password for user access, a login and password verification unit, an input unit, a unit for storage of a standard configuration of resources, a resource configurator, a control unit, a visualization unit, said control unit is designed so as to ensure data exchange with the user identification data storage unit, the user geographical data storage unit, the unit for storage of login and password for user access, the login and password verification unit, the input unit, the unit for storage of a standard configuration of resources, the resource configurator, the visualization unit, and processing of said information by means of said units, a user biometric data storage unit, a unit for switching between aliases, a unit for linking user data to alias data, first alias identification data storage unit, first alias geographical data storage unit, first alias biometric data storage unit, first unit for alias login and password storage, an active aliases selection unit, a new alias creation unit, an attribute copying unit, a unit for searching by attributes, an alias deletion unit, said control unit is designed so as to ensure data exchange with the user biometric data storage unit, the unit for switching between aliases, the unit for linking user data to alias data, the first alias identification data storage unit, the first alias geographical data storage unit, the first alias biometric data storage unit, the first unit for alias login and password storage, the active aliases selection unit, the new alias creation unit, the attribute copying unit, the unit for searching by attributes, the alias deletion unit and the user identification data storage unit, the user geographical data storage unit, the unit for storage of login and password for user access, the login and password verification unit, the input unit, the unit for storage of a standard configuration of resources, the resource configurator, the visualization unit, and processing of said information by means of said units.

BRIEF DESCRIPTION OF THE DRAWINGS

The utility model is explained by a drawing wherein a diagram of the device is displayed.

EMBODIMENT OF THE INVENTION

The FIGURE shows: the user identification data storage unit 1, the user geographical data storage unit 2, the user biometric data storage unit 3, the unit for storage of login and password for user access 4, the unit for switching between aliases 5, the unit for linking user data to alias data 6, the login and password verification unit 7, the input unit 8, the first alias identification data storage unit 9, the first alias geographical data storage unit 10, the first alias biometric data storage unit 11, the first unit for alias login and password storage 12, the active aliases selection unit 13, the unit for storage of a standard configuration of resources 14, the new alias creation unit 15, the attribute copying unit 16, the unit for searching by attributes 17, the alias deletion unit 18, the resource configurator 19, the control unit 20, the visualization unit 21.

Main elements of the device are the user identification data storage unit 1, the user geographical data storage unit 2, the user biometric data storage unit 3, the unit for storage of login and password for user access 4, the unit for switching between aliases 5, the unit for linking user data to alias data 6, the login and password verification unit 7, the input unit 8, the first alias identification data storage unit 9, the first alias geographical data storage unit 10, the first alias biometric data storage unit 11, the first unit for alias login and password storage 12, the active aliases selection unit 13, the unit for storage of a standard configuration of resources 14, the resource configurator 19, the new alias creation unit 15, the attribute copying unit 16, the unit for searching by attributes 17, the alias deletion unit 18, the control unit 20, the visualization unit 21.

For the purpose of this application the term "data" is construed as a synonym of the term "information" according to the information published in http://www1.fips.ru/wps/portal/IPC/IPC2011_extended_XML/?xml=http://www1.fips.ru/IPC2011_extended_XML/Alpc-20110101_subclass-G_XML/Aipc20110101-class_G.xml.

The user identification data storage unit 1 is built so as to store previously entered user identification data, such as, in particular, a first name, a last name, a patronymic, gender, nationality, mother tongue, date of birth, passport data, a photograph and other data used to identify the user among other users.

The user geographical data storage unit 2 is built so as to store the information on a user's location, in particular, the user's actual and registered residence, place of birth, nationality and other geographical data.

The user biometric data storage unit 3 is built so as to store the information on a user's physical parameters, in particular, the user's height, weight, retinal scan, hand geometry, voice sample and other user biometrics.

The device can have additional units for storage of any other user data, for instance, interests, contact data, social and other data.

The unit for storage of login and password for user access 4 is built so as to store a login and a password utilized by a user to access the system under a username and to identify said user by a system administrator.

For the purpose of this application an alias shall be construed to denote a reference name or nickname (for a definition of an alias see http://russian_argo.academic.ru/137/%D0%B0%D0%BB%D0%B8%D0%B0D1%81, uploaded on Sep. 13, 2011) of a user in a computer network (including a social network) linked to the user's initial data (and the set of such data). For this purpose, the user data to which the alias data is linked is unavailable to the other users as well as the information on the linking itself. Each alias can have its own identification data, biometric data, geographical data linked to the same, e.g. in a way similar to databases, as well as any other data similar or dissimilar to the user data and/or other aliases data linked to the same user data.

The unit for switching between aliases 5 is built so as to enable a user to switch between the aliases linked to the same user data with the view of using the alias he has switched to.

The unit for linking user data to alias data 6 is built so as to link alias data to user data by any method available. In a particular case, such linking can be accomplished by assigning a specific code to the user and all linked aliases. The unit for linking user data to alias data 6 is built to restrict access of other users to the information on the alias and the user it is linked to.

The login and password verification unit 7 is built so as to compare a login and password entered by means of the input unit 8 with the login and password stored in the unit for storage of login and password for user access 4 or in the first unit for alias login and password storage 12.

The input unit 8 is a device designed so as to enable input of information in alphabetic and numeric characters and of multiple commands into the user identification data storage unit 1, and/or the user geographical data storage unit 2, and/or the user biometric data storage unit 3, and/or the unit for storage of login and password for user access 4, and/or the first alias identification data storage unit 9, and/or the first alias geographical data storage unit 10, and/or the first alias biometric data storage unit 11, and/or the first unit for alias login and password storage 12.

The first alias identification data storage unit 9 is built so as to store the identification data of one of the aliases of a specific user, i.e. a virtual fictional first name, a last name, a patronymic, gender, nationality, mother tongue, date of birth, passport data, a photograph and other data. For this purpose said identification data can be at least partially the same as the identification data of said user or the identification data of another alias.

The first alias geographical data storage unit 10 is built so as to store the virtual fictional information on the location of the user under a specific alias, in particular, the user's actual and registered residence, place of birth, nationality and other geographical data. For this purpose, said alias geographical data can be at least partially the same as the geographical data of said user or of another alias.

The first alias biometric data storage unit 11 is built so as to store the virtual fictional information on the physical parameters of the user under a specific alias, in particular, the user's height, weight, retinal scan, hand geometry, voice sample and other user biometrics.

The device can have additional first units for storage of any other alias data, for instance, interests, contact data, social and other data.

The first unit for alias login and password storage 12 is built so as to store a login and a password utilized by one of the aliases to access the system under this alias and to identify the user under such alias by network administrators.

The active aliases selection unit 13 is built so as to automatically determine and filter currently active aliases from a multitude of aliases linked to specific user data and to enable the user to select one of the active aliases for further activity.

The unit for storage of a standard configuration of resources 14 is built so as to store a standard set of means of access to the required resources assigned to the alias at the original timepoint upon creation of the same alias. Examples of such resources are chatrooms, games, news blocks, photo albums, video albums, video streaming services, online dating sites, polling subsystem, rating subsystem, etc. The means of access are specific logins and passwords if required for access to relevant units equipped with dedicated software to provide such user functionality as games, chatrooms, news blocks and other services as listed above.

The resource configurator 19 is built so as to enable a user to select the required resources and attach the selected resources to the alias, i.e. to the pre-memorized means of access to said resources stored in relevant units. Examples of such resources are a commercial navigation subsystem, an online store configurator subsystem, a virtual money subsystem, a virtual land parcel subsystem, a geolocation subsystem, designer software and other dedicated software. Said resources are accessed in a way similar to that described in the previous paragraph.

The new alias creation unit 15 is built so as to enable creation of a new alias, i.e. to enable access and input of new data into the first alias identification data storage unit 9, first alias geographical data storage unit 10, first alias biometric data storage unit 11. For this purpose, the alias being created, i.e. the first alias identification data storage unit 9, the first alias geographical data storage unit 10, first alias biometric data storage unit 11 are automatically linked to the user data by means of the unit for linking user data to alias data 6.

Attributes are one or more identification parameters (e.g. date of birth or gender), geographical parameters (e.g. nationality), biometrical parameters (e.g. height and weight) or any other user data. User data and alias data can have the same list of attributes. For this purpose, some of the attributes are compulsory, while at least some of the attributes are optional. Some attributes can comprise a list of attributes, for example, several education fields or interest fields.

The attribute copying unit 16 is built so as to copy attributes of a user or previously created aliases to a new alias being created. The attribute copying unit 16 serves to copy at least some of the attributes using relevant software, for instance, from the user identification data storage unit 1, the user geographical data storage unit 2 and the user biometric data storage unit 3 to the first alias identification data storage unit 9, the first alias geographical data storage unit 10, the first alias biometric data storage unit 11 provided that a relevant command is issued by the control unit 20.

The unit for searching by attributes 17 is built to enable search by one of the attributes from among all available aliases of a multitude of users, for example, by age or by residence.

The alias deletion unit 18 is built so as to enable deletion of the alias data, i.e. said data is deleted—by means of relevant software installed in the respective unit—from the first alias identification data storage unit 9, the first alias geographical data storage unit 10, the first alias biometric data storage unit 11 as well as from the resources assigned to that alias. However, the resources (entries in relevant units) shared between other aliases are not deleted.

The control unit 20 is built so as to control communication with the user identification data storage unit 1, the user geographical data storage unit 2, the user biometric data storage unit 3, the unit for storage of login and password for user access 4, the unit for switching between aliases 5, the unit for linking user data to alias data 6, the login and password verification unit 7, the input unit 8, the first alias identification data storage unit 9, the first alias geographical data storage unit 10, the first alias biometric data storage unit 11, the first unit for alias login and password storage 12, the active aliases selection unit 13, the unit for storage of a standard configuration of resources 14, the resource configurator 19, the new alias creation unit 15, the attribute copying unit 16, the unit for searching by attributes 17, the alias deletion unit 18 and the visualization unit 21. For this purpose, the units incorporated in the device are connected within the framework of the device so that all relevant signals and information could be communicated, e.g. through the system bus or by direct connection of the relevant units or by another method ensuring that said units are interconnected and the data is communicated.

The visualization unit 21 is an output electronic device designed to display information (a screen). The visualization unit 21 is built so as to enable display of the information fed through the input unit 8 and the information stored in the user identification data storage unit 1, the user geographical data storage unit 2, the user biometric data storage unit 3, the unit for storage of login and password for user access 4, the unit for switching between aliases 5, the first alias identification data storage unit 9, the first alias geographical data storage unit 10, the first alias biometric data storage unit 11, the first unit for alias login and password storage 12, the active aliases selection unit 13, the unit for storage of a standard configuration of resources 14, the resource configurator 19, the new alias creation unit 15, the attribute copying unit 16 and the unit for searching by attributes 17. A display, a monitor, a screen or any other visualization device can be used as the visualization unit 21.

INDUSTRIAL APPLICABILITY

The utility model is implemented as follows. The device is made of the above units by way of connecting the same, ensuring, at the same time that all relevant commands and information could be communicated, and by enclosing the same in a case.

Using the input unit 8, the required attributes (that appear as entries, code sets, including ASCII or UTF-8 (a multitude of other encodings is available and can be utilized for this purpose) are introduced in the user identification data storage unit 1, the user geographical data storage unit 2, the user biometric data storage unit 3 and the unit for storage of login and password for user access 4. The attributes as introduced are displayed by the visualization unit 21. Upon exiting the system a user can enter it again. For this purpose, the user utilizes the input unit 8 to enter a login and a password to access the system. The control unit 20 issues a verification command to the login and password verification unit 7. The login and the password entered are compared with the login-password combination stored in the unit for storage of login and password for user access 4. If the login and the password entered match the login-password combination stored in the unit for storage of login and password for user access 4, the user is automatically granted access (right of input or data transfer) to the user identification data storage unit 1, the user geographical data storage unit 2, the user biometric data storage unit 3, the first alias identification data storage unit 9, the first alias geographical data storage unit 10, the first alias biometric data storage unit 11.

If required, the user utilizes the new alias creation unit 15 to create a new alias. For this purpose, the unit for linking user data to alias data 6 automatically links the data of the alias being created to the user data (e.g. by means of the respective code). Other users in the system have no access to the data on alias linking to said user. However, these data are available to the administrator of the system. The alias data can be linked to the user data by means of, for instance, assigning a specific code to the user data and all its aliases.

The user can utilize the attribute copying unit 16 to copy some or all user attributes from the user identification data storage unit 1, the user geographical data storage unit 2, the user biometric data storage unit 3 or to copy some or all attributes of the previously created aliases to the first alias identification data storage unit 9, the first alias geographical data storage unit 10, the first alias biometric data storage unit 11. For this purpose, the alias attributes can be fully or partially identical to the user data or the data of a previously created alias or can differ completely from the same. If required, the user can assign a specific login-password combination for the same alias, said combination stored in the first unit for alias login and password storage 12 and used to access the system.

As the new alias is created, the control unit 20 issues an automatic command to the unit for storage of a standard configuration of resources 14 to assign the standard configuration of resources to the newly created alias. The user has an option to select required resources and attach the same to the alias by means of the resource configurator 19.

In this way the user has an option to create a required quantity of aliases with different or similar attributes and linked resources. In addition, the user has an option to create an "anonymous" alias to enable the user to engage anonymously in some data exchange operations and discussions. The anonym has a restricted access to the system resources. The list of restrictions is defined by the system administrators.

The active aliases selection unit 13 automatically determines which aliases are switched on by the user at the moment and are active, with active aliases displayed by the visualization unit 21. The user can switch between the active aliases by means of the unit for switching between aliases 5.

In general, the proposed system differs from other existing systems in that it offers the user a number of tools, one of which is the option of registration (opening) of a new "nickname" or alias without having to open a new user page in the network by linking the user to the already registered (first) original address (user data) with the relevant alias or just a "username" (a "nickname").

The system of aliases implies presenting a user with a plurality of aliases (nicknames) with the aim of sorting the computer network resources according to composition and access. Resources of one type can be divided between different aliases according to access to said resources. For instance, different photo albums can be linked to different aliases; for this purpose, some albums will be accessible on the device if an alias without the password was used to access the system, while access to other albums can only be granted if the system was accessed using an alias with the password.

If required, the user has an option to initiate a search from among a plurality of aliases linked to other users by the attributes of interest, e.g. by residence. Such option is ensured by the provision of the unit for searching by attributes 17. The user enters a logic query by means of the input unit 8, and then the unit for searching by attributes 17 compares the values for attributes set in the search query with the values for the attributes of all aliases and selects from the same those that match the search criteria.

If required, the user can delete an alias by means of the alias deletion unit 18. In this case all attributes and resources of the alias are deleted except those shared between other aliases.

If a user is deleted from the system, all aliases linked to the user data are also deleted.

Therefore, a device comprised of the above units serves to extend functional possibilities by virtue of organizing a system of pseudonyms (aliases), the possibility of grouping and assigning to aliases different groups of resources, including resources that enable communication with other clients in the network (e.g. a social network), presenting a real user with a plurality of aliases with the aim of sorting resources of a network (including a social network) according to composition, which makes it possible for the user to set limits for access to different groups of resources with the aid of passwords.

The invention claimed is:

1. Device for controlling network user data, comprising a user identification data storage unit, a user geographical data storage unit, a unit for storage of login and password for user access, a login and password verification unit, an input unit, a unit for storage of a standard configuration of resources, a resource configurator, a control unit, a visualization unit, said control unit is designed so as to ensure data exchange with the user identification data storage unit, the user geographical data storage unit, the unit for storage of login and password for user access, the login and password verification unit, the input unit, the unit for storage of a standard configuration of resources, the resource configurator, the visualization unit, and processing of said information by means of said units, characterised in that it incorporates a user biometric data storage unit, a unit for switching between aliases, a unit for linking user data to alias data, first alias identification data storage unit, first alias geographical data storage unit, first alias biometric data storage unit, first unit for alias login and password storage, an active aliases selection unit, a new alias creation unit, an attribute copying unit, a unit for searching by attributes, an alias deletion unit, said control unit is designed so as to ensure data exchange with the user biometric data storage unit, the unit for switching between aliases, the unit for linking user data to alias data, the first alias identification data storage unit, the first alias geographical data storage unit, the first alias biometric data storage unit, the first unit for alias login and password storage, the active aliases selection unit, the new alias creation unit, the attribute copying unit, the unit for searching by attributes, the alias deletion unit and the user identification data storage unit, the user geographical data storage unit, the unit for storage of login and password for user access, the login and password verification unit, the input unit, the unit for storage of a standard configuration of resources, the resource configurator, the visualization unit, and processing of said information by means of said units.

\* \* \* \* \*